H. BOOKER.
ATTACHMENT FOR WHEELS.
APPLICATION FILED JAN. 4, 1912.
1,034,410.
Patented Aug. 6, 1912.
2 SHEETS—SHEET 1.
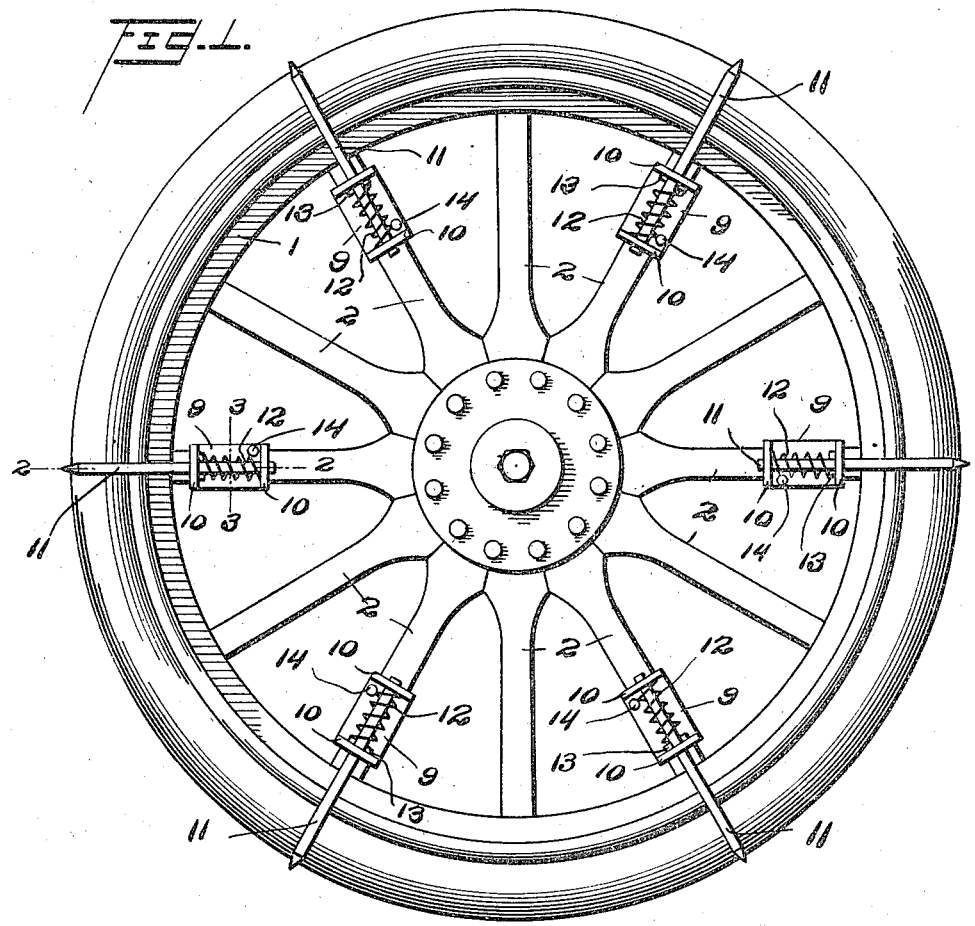
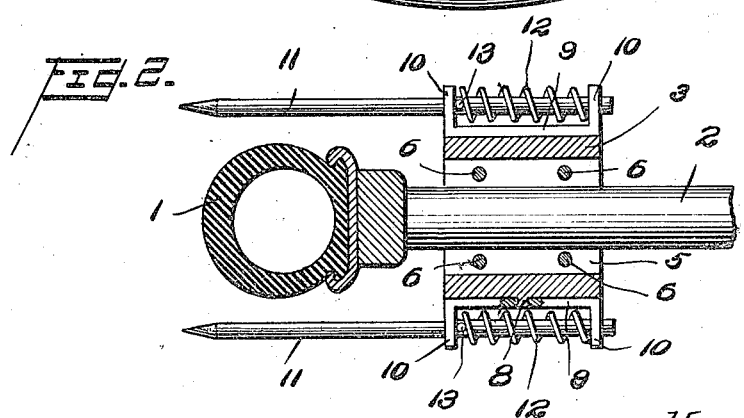
Witnesses
H. Strauss
R. N. Krenkel
Inventor
Harvey Booker
By Joshua R. N. Potts,
Attorney

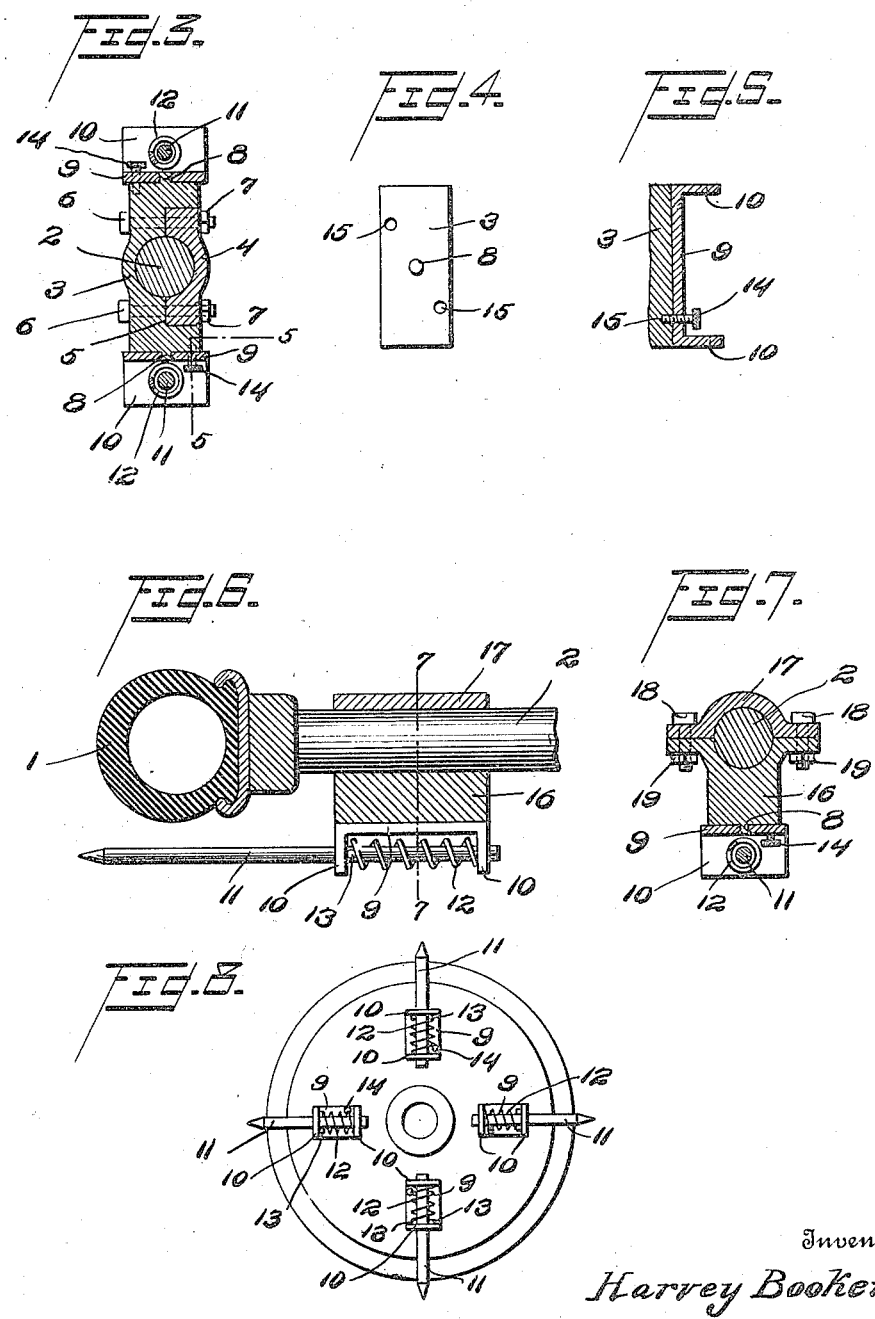

UNITED STATES PATENT OFFICE.

HARVEY BOOKER, OF WILMINGTON, DELAWARE.

ATTACHMENT FOR WHEELS.

1,034,410.

Specification of Letters Patent.　　Patented Aug. 6, 1912.

Application filed January 4, 1912. Serial No. 669,346.

*To all whom it may concern:*

Be it known that I, HARVEY BOOKER, a citizen of the United States, residing at Wilmington, in the county of Newcastle and State of Delaware, have invented certain new and useful Improvements in Attachments for Wheels, of which the following is a specification.

My invention relates to improvements in attachments for wheels, the object of the invention being to provide an attachment for wheels, which is designed to prevent skidding or slipping of the wheel so as to compel the wheel to grip the ground to insure the starting of the vehicle, and also to prevent slipping sidewise.

A further object is to provide an attachment which is especially designed for use on automobile wheels, and which may be readily turned so as to be moved into operative or into inoperative position, and securely held in either of its positions.

With these and other objects in view, the invention consists in certain novel features of construction and combinations and arrangements of parts, as will be more fully hereinafter described and pointed out in the claims.

In the accompanying drawings: Figure 1, is a view in side elevation of an automobile wheel illustrating my improvements in operative position thereon. Fig. 2, is a view in section on an enlarged scale on the line 2—2 of Fig. 1. Fig. 3, is a view in cross section on the line 3—3 of Fig. 1. Fig. 4, is an end view of the block 3. Fig. 5, is a view in section on the line 5—5 of Fig. 3. Fig. 6, is a view similar to Fig. 2 illustrating a modification. Fig. 7, is a view in section on the line 7—7 of Fig. 6, and Fig. 8, is a view in elevation of a car wheel showing my improvements mounted thereon.

1, represents a wheel such as ordinarily used on automobiles and to certain of the spokes 2 of which, blocks 3 are secured. These blocks 3 extend transversely through the wheel, and have half bearings to coöperate with a removable plate 4 secured in a recess 5 in block 3 by means of bolts 6, and nuts 7, so as to securely clamp the block on the spoke. In other words, the block 3 is cut out or recessed to receive the plate 4, so that when the latter is securely held by means of the bolts and nuts, a smooth finished appearance will be given the block, and the latter will be fixed to the spoke.

The ends of the block 3 are flat, and are provided centrally with studs 8 on which brackets 9 have rotary mounting, and are secured. In other words, the studs 8 are projected through central openings in the brackets 9, and are upset at their ends so as to securely hold the brackets, yet permit the latter rotary movement. The brackets 9, at their ends, are provided with perforated ears 10, in which spikes 11 are mounted. These spikes 11 have pointed ends to engage the ground and coiled springs 12 are located around the spikes between the ears 10, and bear against transverse pins 13 in the spikes, normally pressing the spikes outwardly so as to elastically contact with the ground. Thumb screws 14 are mounted in the brackets 9, and are adapted to be screwed into either of two sockets 15 in the blocks 3, so as to hold the bracket in position to project the pointed end of the spike outwardly when the attachment is in use or hold the brackets with the spikes projected inwardly, when they are not adapted for use. In other words, the brackets are permitted to turn on the studs 8, so as to project the spikes outwardly or to project them inwardly, and the thumb screw 14 will securely hold the bracket in either of these positions.

In the modification illustrated in Figs. 6, and 7, a block 16 is provided which is clamped by means of a plate 17, which latter and the block are made with perforated ears for the reception of bolts 18, and nuts 19 to clamp the block to the spoke. While this block projects to one side of the spoke only, and not to both sides as is the case with the form above described, in all other respects it is similar to that above described, and is provided with a bracket and spike corresponding to the bracket and spike of the form shown in Figs. 1 and 2, and hence the same reference characters are used to designate the same parts in both forms.

In Fig. 8, I illustrate my improved brackets with their spikes on the outer face of a car wheel. With this form of my invention, while the brackets and the spikes are constructed as above explained, and have corresponding reference characters on the drawings, the spikes are adapted to engage the ground outside of the rail so as to prevent slipping of the wheel in starting, and also dispenses with the necessity for using sand on the track.

Various other slight changes might be made in the general form and arrangement of parts described without departing from my invention, and hence I do not limit myself to the precise details set forth, but consider myself at liberty to make such changes and alterations as fairly fall within the spirit and scope of the appended claims.

Having thus described my invention, what I claim as new and desire to secure by Letters Patent is:

1. An attachment of the character described, comprising a block, means for securing said block to a wheel spoke, a stud on said block, a bracket having rotary mounting on said stud, perforated ears on said bracket, a spike mounted to reciprocate in said perforated ears, a coiled spring around said spike between the ears and engaging the spike, said block having sockets therein, and a thumb screw in said bracket adapted to engage in either of said sockets and hold the bracket in position to project the spike outwardly or inwardly, substantially as described.

2. An attachment of the character described, comprising a block having a recessed spoke receiving intermediate portion, a plate secured in said recess and adapted to clamp a spoke against the block, studs on the ends of said block, brackets having rotary mounting on said studs, spring-pressed spikes in said brackets, and means for holding said bracket in position to project the spikes outwardly or inwardly, substantially as described.

In testimony whereof I have signed my name to this specification in the presence of two subscribing witnesses.

HARVEY BOOKER.

Witnesses:
 R. H. KRENKEL,
 CHARLES E. POTTS.

---

Copies of this patent may be obtained for five cents each, by addressing the "Commissioner of Patents, Washington, D. C."